(12) United States Patent
Patti et al.

(10) Patent No.: US 6,504,666 B1
(45) Date of Patent: Jan. 7, 2003

(54) WRITE HEAD DRIVER CIRCUIT AND METHOD FOR WRITING TO A MEMORY DISK

(75) Inventors: Giuseppe Patti, Dublin (IE); Roberto Alini, Pleasonton, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 73 days.

(21) Appl. No.: 09/651,561

(22) Filed: Aug. 30, 2000

(51) Int. Cl.[7] .............................. G11B 5/02; G11B 5/09
(52) U.S. Cl. ............................ 360/68; 360/46; 327/110
(58) Field of Search ..................... 360/46, 68; 327/424, 327/110

(56) References Cited

U.S. PATENT DOCUMENTS

| | | | |
|---|---|---|---|
| 4,551,772 A | 11/1985 | Sliger ........................... 360/46 |
| 4,937,802 A | 6/1990 | Omori et al. ................... 369/13 |
| 5,041,773 A | 8/1991 | Takahashi ..................... 318/696 |
| 5,378,943 A | 1/1995 | Dennard ........................ 326/68 |
| 5,434,717 A | * 7/1995 | Yoshinaga et al. ............. 360/46 |
| 5,751,179 A | 5/1998 | Pietruszynski et al. ...... 327/379 |
| 5,892,371 A | 4/1999 | Maley ........................... 326/81 |
| 5,926,056 A | 7/1999 | Morris et al. ................. 327/333 |
| 6,018,257 A | 1/2000 | Hung et al. ................... 327/112 |
| 6,052,017 A | 4/2000 | Pidutti et al. ................. 327/424 |
| 6,054,888 A | 4/2000 | Maley ........................... 327/333 |
| 6,081,152 A | 6/2000 | Maley ........................... 327/320 |
| 6,121,800 A | 9/2000 | Leighton et al. ............. 327/110 |
| 6,201,421 B1 | 3/2001 | Takeuchi et al. ............. 327/110 |
| 6,236,246 B1 | 5/2001 | Leighton et al. ............. 327/110 |
| 6,252,450 B1 | * 6/2001 | Patti et al. .................... 327/424 |

OTHER PUBLICATIONS

U.S. patent application, 09/651,830, Alini, Aug. 30, 2000.
Patti et al, U.S. application 09/839,511, filed Apr. 20, 2001.
Patti et al, U.S. application 09/991,557, filed Nov. 9, 2001.

* cited by examiner

*Primary Examiner*—Regina N. Holder
(74) *Attorney, Agent, or Firm*—Lisa K. Jorgenson; Andre Szuwalski

(57) ABSTRACT

A method and circuit are disclosed for controlling the write head of a magnetic disk storage device. The circuit includes a pull-up device and a current sink circuits coupled to each terminal of the write head, for selectively sourcing current to and sinking current from the write head, respectively. A clamp device is coupled to each write head terminal to selectively clamp the write head terminals to steady state intermediate voltage levels. The circuit further includes a control circuit for individually activating the pull-up devices, the current sink circuits and the clamp devices. In particular, when reversing the direction of current flow through the write head from a first direction in which current is provided to the write head via the write head terminal to a second direction in which current is drawn from the write head from the write head terminal, the appropriate pull-up device is activated for a predetermined period of time. The clamp device coupled to the temporarily activated pull-up device is thereafter activated to clamp the corresponding write head terminals to the steady state intermediate voltage levels.

27 Claims, 6 Drawing Sheets

WRITE HEAD DRIVER CIRCUIT AND METHOD FOR WRITING TO A MEMORY DISK

CROSS REFERENCE TO RELATED APPLICATION

This application is related to an application entitled "Circuit and Method for Writing to a Memory Disk" Ser. No. 09/393,058, filed Nov. 17, 1999, now U.S. Pat. No. 6,252,450, and an application entitled "Method for Differentially Writing to a Memory Disk" (Ser. No. 09/651,830), filed Aug. 30, 2000). The applications are incorporated by reference herein.

BACKGROUND OF THE INVENTION

1. Technical Field of the Invention

The present invention relates to circuit and method for writing to a memory disk, and particularly to a circuit and method for driving the write head of a disk drive device.

2. Background of the Invention

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits and/or write drive circuits used to supply such write signals to the heads included preamplifier circuits to drive the current through selected legs of an "H-bridge" circuit, which is capable of allowing relatively fast current reversals for accurate data reproduction.

An example of a typical H-bridge write head drive circuit 10, according to the prior art, is shown in FIG. 1. The circuit 10 includes four MOS transistors, 12–15 connected between a high reference voltage $V_{CC}$ and a low reference voltage Vss. A coil 19, used, for example, to supply data pulses for writing to a disk drive media is integrated into the write head mechanism. The coil 19 is connected between the center legs of the H-bridge, as shown.

It can been seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistor 12 and 14 serve as switching transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above. In conventional driver circuits for controlling the write head of a disk drive, the steady state voltage levels to which the two terminals of write head 19 settle are both typically near either the high reference voltage level Vdd or the low reference voltage level Vss. p One problem encountered in disk drives employing existing drive circuitry for the write head coil 19 is that the wires or lines connecting the write head coil 19 to the write drive circuitry are located proximally to the wires or lines connecting the read head to the read channel circuitry (not shown in FIG. 1). The close proximity between the wires capacitively couples the wires together. As a result, voltage spikes or other voltage transitions appearing on the lines connected to write head coil 19 may have a greater tendency to appear as noise on the lines connected to the read head of the disk drive and potentially damage the read head as a result.

Because of the inductive nature of the write head coil 19 and because conventional steady state voltage levels for the write head terminals are approximately near the high reference voltage level Vcc, a relatively sizeable voltage spike typically may be generated on a terminal of write head 19 (the terminal of write head 19 having a voltage signal experiencing a falling transition) during the time that the current passing through write head 19 transitions from one direction to another. In other words, a relatively sizeable voltage spike appears on a terminal of the write head when the write head transitions between steady states. As can be seen, this relatively sizeable voltage spike may be capacitively coupled to the lines associated with the read head of the disk drive and thereby damage the read head.

As data rates increase, the rates at which the heads can accurately write the data to the magnetic media is limited by the speed at which the flux in the coil 19 (and its associated components) can be reversed. Relatedly, the amplitude of voltage spikes appearing on a write head terminal (and noise appearing on the corresponding read head terminals) is based in part upon the rate of flux reversal. The maximum data rate is thus limited to the maximum physical flux reversal rate of the write head drive circuitry and the maximum allowable noise that may be tolerated at the read head during the period of flux reversal.

What is needed, therefore, is a method and circuit for driving an inductive load of the type used in conjunction with a write head of a disk drive with a signal that enables a maximum flux reversal rate in the driver coil in an absence of an appreciable amount of noise on lines capacitively coupled to the inductive load.

SUMMARY OF THE INVENTION

The present invention overcomes the shortcomings in prior systems and satisfies a significant need for a driver circuit for an inductive load, such as the write head of a disk drive or other disk storage device. When utilized in conjunction with or as part of a disk drive, the driver circuit provides a current to the write head so that current flows through the write head in one direction or the other. The driver circuit includes a pair of identical sub-circuits, each sub-circuit being connected to a distinct terminal of the write head. Each driver sub-circuit forms a leg of an H-bridge driver circuit.

Each driver sub-circuit includes a pull-up and/or switching device having a first terminal connected to a high reference voltage source and a second terminal coupled to the corresponding write head terminal. The driver sub-circuit further includes first and second current sink circuits coupled to the terminal of the write head in parallel relation to each other. The first and second current sink circuits are each capable of sinking current from the corresponding terminal of the write head. The driver circuit further includes a control circuit connected to the pull-up device and the first and second current sink circuits of each driver sub-circuit, for controlling current flow through the write head so as to write data on a corresponding magnetic storage disk.

In order to reduce the amount of noise appearing on the lines for the read head due to capacitive coupling to the lines driving the write head, the driver circuit controls the voltage levels appearing on the write head terminals so that the steady state voltage levels thereof are approximately at a midpoint between a high reference voltage level and a low reference voltage level. In this way, a voltage spike appears at each write head terminal during the time current flowing through the write head changes direction, instead of appearing primarily on a single write head terminal. Specifically, the amplitudes of the voltage spikes are roughly half the amplitude of the voltage spike appearing on a write head terminal of a conventionally driven write head. In addition, the voltage spikes appearing on the write head terminals occur at substantially the same time and are in opposite directions, thereby tending to offset the noise caused by each. Because the amplitude of each voltage spike is reduced and because the voltage spikes occur in opposite directions, the cumulative effect of the voltage spikes on the read head terminals is substantially reduced.

In accordance with the embodiments of the present invention, the driver circuit includes a pair of clamping elements for clamping the write head terminals to the desired steady state voltage levels. A first clamping element is coupled to a first terminal of the write head and a second clamping element is coupled to a second terminal of the write head. The control circuit selectively activates one of the first and second clamping elements at a time so as to clamp the write head terminals to the desired steady state voltage levels.

As stated above, it is desirous for H-bridge driver circuits to cause the current flowing through the write head to relatively quickly switch directions. In order to lessen the transition time between the current flowing through the write head in one direction and current flowing therethrough in the opposite direction, the control circuit activates the appropriate pull-up device and first current sink circuit as well as the corresponding second current sink circuit during the current transition. The activation of both first and second current sink circuits causes the current passing through the write head to quickly ramp towards the intended destination current level. The second current sink circuit is activated by the control circuit until the current level in the write head approximately reaches the intended current level. The control circuit thereupon deactivates the second current sink circuit so as to limit the overshoot of current flowing through the write head. The pull-up device is also deactivated at this time.

Following deactivation of the pull-up device and the second current sink circuit, the clamp device to which the deactivated pull-up device is coupled is activated by the control circuit. The clamp device clamps the corresponding write head terminal to a predetermined voltage level, such as approximately the midpoint between the high and low reference voltage levels. This predetermined voltage level serves as the steady state voltage level of the write head terminal. The steady state voltage level of the other write head terminal settles at a voltage relatively slightly less than the predetermined voltage level.

In this way, the time associated with reversing current through the write head is minimized without experiencing substantial current overshoot or undershoot relative to the desired destination current level and without creating an appreciable level of noise elsewhere in the disk drive system.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 1:
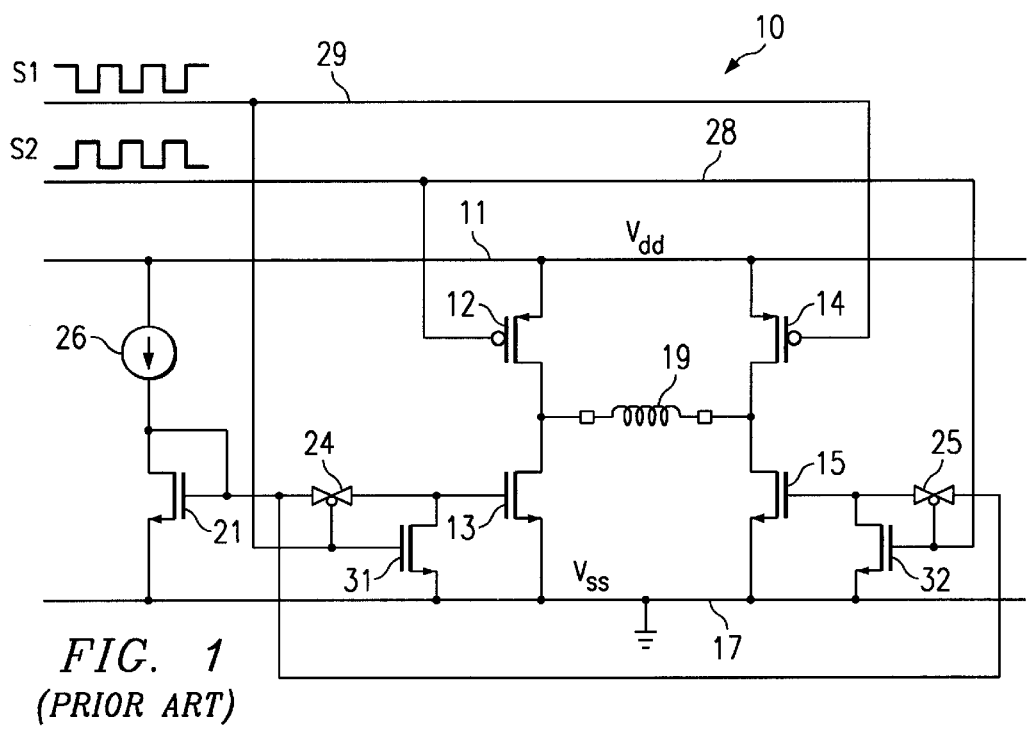
FIG. 1 illustrates a schematic diagram of a conventional H-bridge driver circuit for a write head of a disk storage device, as described above.
Figure 2:
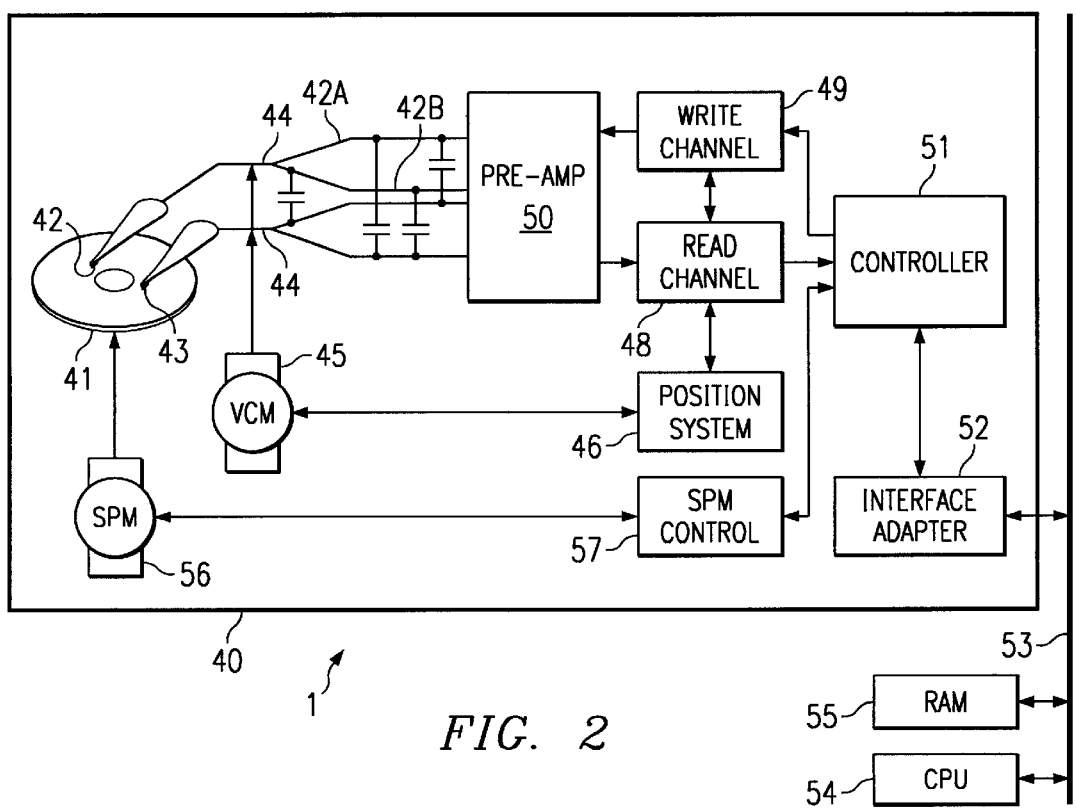
FIG. 2 illustrates a function block diagram of a system including a disk drive device according to an embodiment of the present invention.

Referring to FIG. 2, there is shown a block diagram of a data storage, information processing and/or computer system 1 including a disk drive 40 in accordance with the present invention. Disk drive 40 includes a storage medium in the form of one of more disks 41, each of which may contain data on both sides of the disk. Data is written to disks 41 using one or more write heads 42, and read therefrom by one or more read heads 43. Each write head 42 and read head 43 is connected to an arm 44 and is positionally controlled by a voice-coil motor ("VCM") 45 and a position system 46. The position system 46, through VCM 45, positionally maintains and/or moves write head 42 and read head 43 radially over the desired data on disks 41. A read channel 48 converts an analog read signal from read head 43 into digital form. A write channel 49 provides data in analog form to write head 42 for storing on a disk 41. A pre-amplifier 50 suitably conditions data read from and data to be written to disk 41. Channel controller 51 recognizes and organizes the digital data from the read channel 48 and digital data to be sent to write channel 49 into bytes of data. An interface adapter 52 provides an interface between channel controller 11 and a system bus 53 that may be particular to the host (data storage, information processing and/or computer) system 1. The host system 1 will also typically have other devices that communicate on system bus 53, including a central processing unit ("CPU") 54 and volatile memory 55. A spindle motor ("SPM") 56 and SPM control circuit 57 rotate disk 41 and maintain disk 41 at the proper speed for performing a memory access operation (read or write operation). The SPM control circuit 57 may communicate with interface adapter 52 or controller 51, as shown in FIG. 2. It is understood that disk drive 40 may be divided into and/or include other function blocks from those shown in FIG. 2, and that the particular function block implementations illustrated in FIG. 2 are presented as an exemplary embodiment of the present invention.

Figure 3:
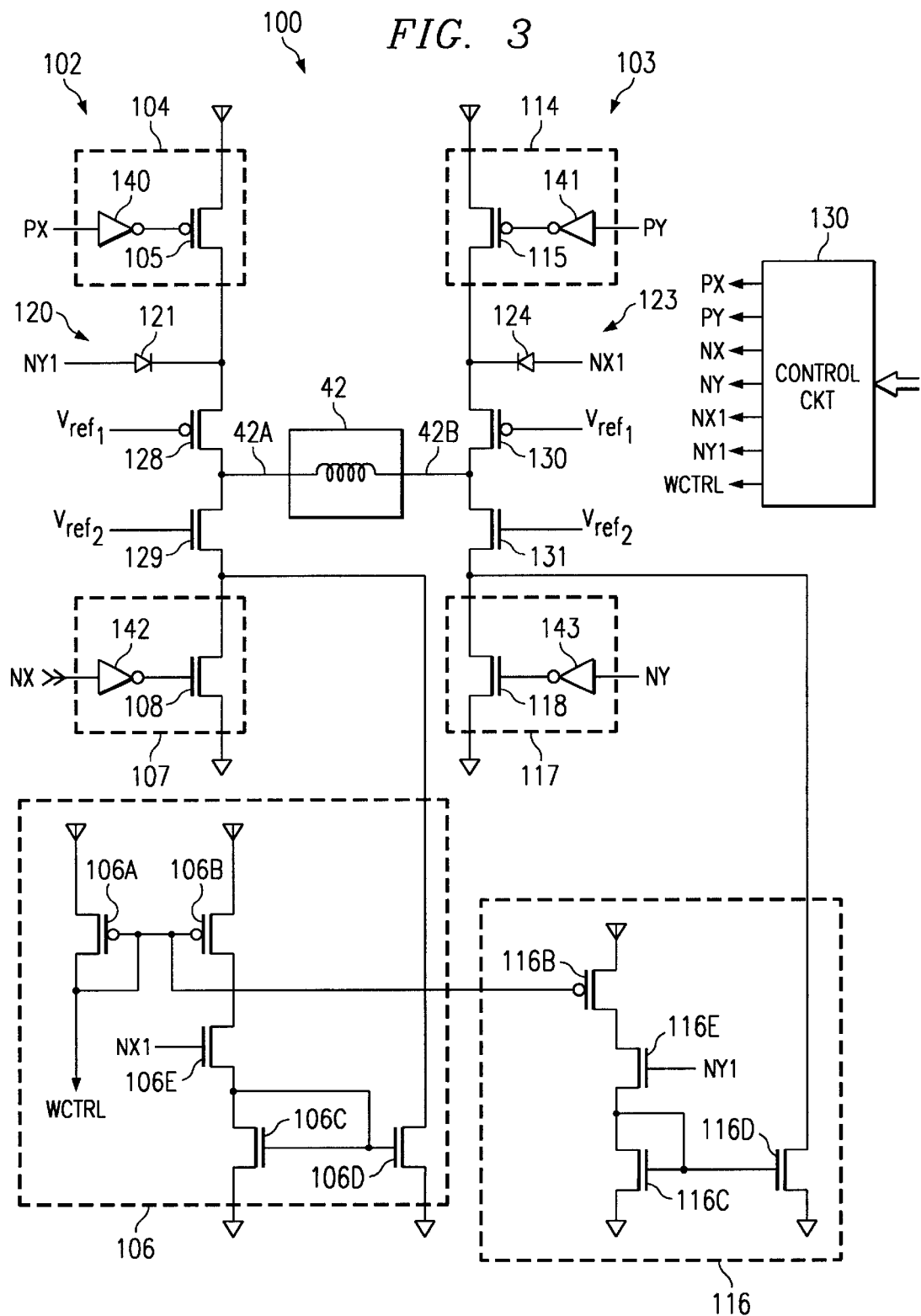
FIG. 3 illustrates a schematic diagram of a driver circuit for a write head of a disk storage device according to a first embodiment of the present invention.

Referring to FIG. 3, there is shown a driver circuit 100 for driving the write head 42 of a magnetic disk storage device. Driver circuit 100 is implemented as an H-bridge circuit wherein current is provided to write head 42 through selected legs of driver circuit 100 for writing data onto an associated magnetic storage disk. Driver circuit 100 is located within preamplifier block 50.

Driver circuit 100 includes a pair of identical sub-circuits 102 and 103, each of which is associated with a distinct terminal of write head 42. Sub-circuit 102 supplies a current to and sinks a current from write head 42 through terminal 42A thereof. Similarly, sub-circuit 103 supplies a current to and sinks a current from write head 42 through terminal 42B thereof. In this way, simultaneously controlling sub-circuits 102 and 103 provides a current through write head 42 having the desired current level and direction.

Sub-circuit 102 includes a clamp device 120 having a first terminal that is coupled to write head terminal 42A. When activated, clamp device 120 provides current to write head terminal 42A, while simultaneously clamping write head terminal 42A to a predetermined voltage level. Clamp device 120 is used to set the steady state voltage levels appearing on write head terminals 42A and 42B, as discussed further below. Clamp device 120 receives a control signal that is used to activate and deactivate clamp device 120.

In a first embodiment of the present invention shown in FIG. 3, clamp device 120 is a diode 121 having a cathode coupled to write head terminal 42A and an anode connected to control signal NY1. Diode 121 is activated by control signal NY1 having a voltage level that forward biases diode 121. When forward biased, diode 121 clamps the voltage appearing on write head terminal 42A to a p-n junction voltage less than the voltage level appearing on control signal NY1.

Figure 4:
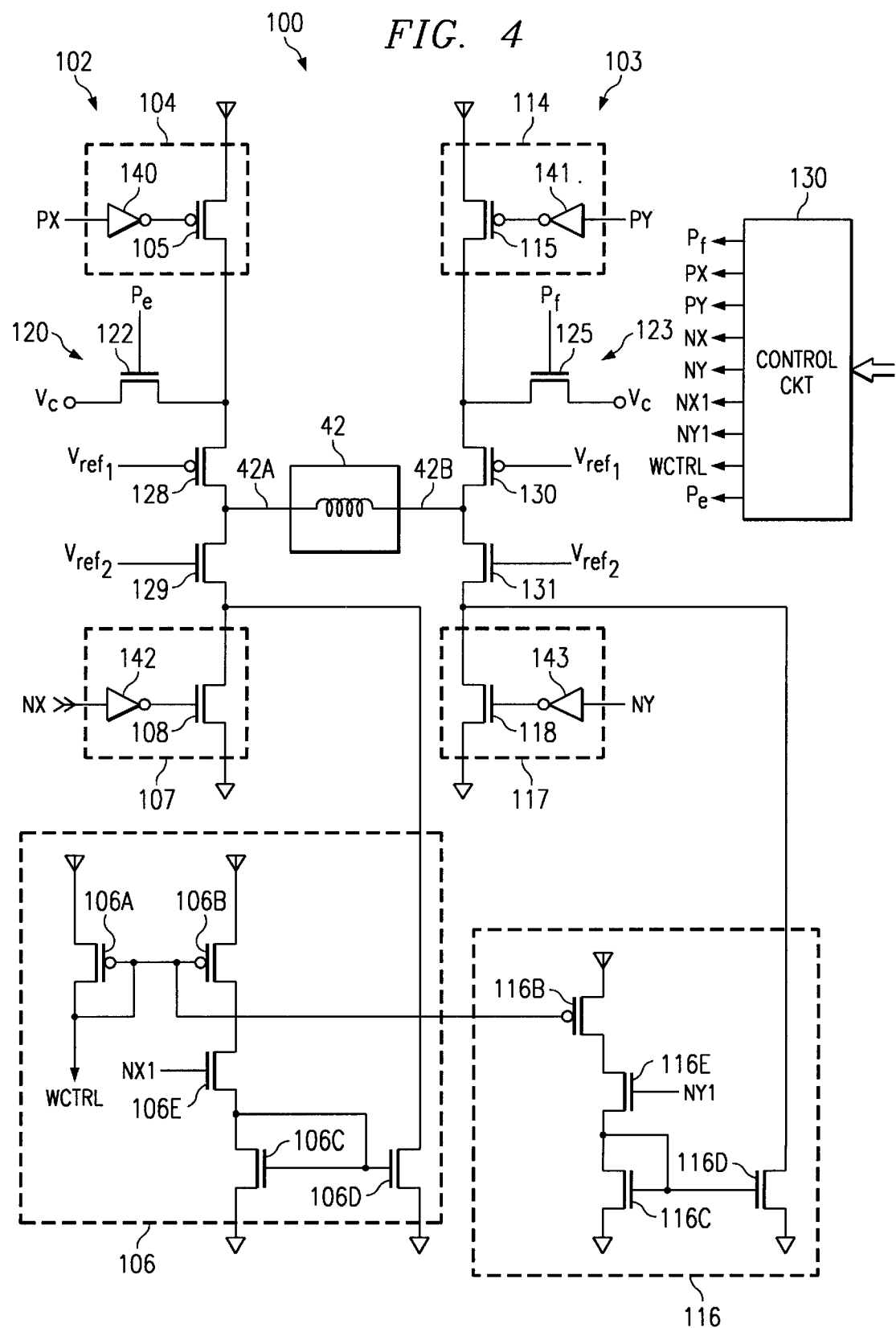
FIG. 4 illustrates a schematic diagram of a driver circuit for a write head of a disk storage device according to a second embodiment of the present invention.

In a second embodiment of the present invention shown in FIG. 4, clamp device 120 is a transistor 122 having a first conduction (source) terminal coupled to write head terminal 42A, and a second conduction (drain) terminal coupled to a reference voltage level Vc, such as a voltage level between high reference voltage level Vdd and low reference voltage level Vss. Transistor 122 is activated by control signal Pe being driven to a voltage level to turn on transistor 122. Once turned on, a conduction path exists between reference voltage level Vc and the write head terminal 42A, thereby serving to clamp write head terminal 42A to approximately reference voltage level Vc.

It is understood that clamp device 120 may be formed of other components to clamp write head terminal 42A to a desired voltage level.

Sub-circuit 102 of driver circuit 100 includes a pull-up device 104 connected between terminal 42A of write head 42 and high reference voltage, Vdd. In a preferred embodiment of the present invention, pull-up device 104 is implemented as a p-channel transistor 105 having a source terminal connected to Vdd and a drain terminal coupled to write head terminal 42A. By controlling the gate terminal of the p-channel transistor 105 with a control signal PX, pull-up device 104 serves as a switching transistor in selectively sourcing a current to write head 42 through write head terminal 42A. Pull-up device 104 is used to source current to write head terminal 42A during a time period when current flow through write head 42 transitions from flowing from write head terminal 42B to write head terminal 42A (right to left as shown in FIG. 3), to flowing from write head terminal 42A to write head terminal 42B (left to right, as shown in FIG. 3).

Sub-circuit 102 of driver circuit 100 further includes a pair of current sink circuits for selectively sinking current from write head 42 through write head terminal 42A. Specifically, sub-circuit 102 includes a first current sink circuit 106 which is coupled to write head terminal 42A. First current sink circuit 106 includes a first current mirror formed by transistors 106A and 106B. Transistor 106A is enabled by a current source being drawing current from the drain of transistor 106A. The current passing through transistor 106A is mirrored in transistor 106B. First current sink circuit 106 includes a second current mirror formed by transistors 106C and 106D. The drain terminal of transistor 106B is coupled to the drain terminal of transistor 106C such that the current passing through transistor 106B passes through 106C and is mirrored in transistor 106D. Control transistor 106E, having a gate terminal driven by a control signal NX1, is connected in series between transistors 106B and 106C to control the flow and/or mirroring of current between the two current mirrors. Current sink circuit 106 is utilized to sink current from write terminal 42A during a steady state condition and during the time current flow is transitioned in order to flow from write head terminal 42B to write head terminal 42A.

It is understood that first current sink circuit 106 may be implemented in a variety of different ways to produce a current that is controlled by a control signal (NX1, in this case).

Sub-circuit 102 of driver circuit 100 further includes a second current sink circuit 107 which is connected in parallel with first current sink circuit 106. Second current sink circuit 107 includes a transistor 108 having a drain terminal coupled to write head terminal 42A and a source terminal tied to a ground potential. The gate terminal of transistor 108 is driven by a control signal NX so that second current sink 107 is activated only during current flow transitions in order to flow from write head terminal 42B to write head terminal 42A. In a preferred embodiment of the present invention, transistor 108 is sized so that when activated, there is a substantially low on resistance ("$R_{on}$") between the drain and source terminals of transistor 108. In this way, second current sink circuit: 107 performs as a switch in sinking a relatively large amount of current when activated.

Because sub-circuit 103 of driver circuit 100 is identical to sub-circuit 102, sub-circuit 103 includes a clamp device 123 coupled to write head terminal 42B. When activated, clamp device 123 provides current to write head terminal 42B, while simultaneously clamping write head terminal 42B to a predetermined voltage level. Clamp device 123 is used to set the steady state voltage levels appearing on write head terminals 42A and 42B, as discussed further below. Clamp device 123 receives a control signal that is used to activate and deactivate clamp device 123.

In the first embodiment of the present invention shown in FIG. 3, clamp device 123 is a diode 124 having a cathode coupled to write head terminal 42B and an anode connected to control signal NX1. Diode 124 is activated by control signal NX1 having a voltage level that forward biases diode 124. When forward biased, diode 124 clamps the voltage appearing on write head terminal 42B to a p-n junction voltage less than the voltage level appearing on control signal NX1.

In the second embodiment of the present invention shown in FIG. 4, clamp device 123 is a transistor 125 having a first conduction (source) terminal coupled to write head terminal 42B, and a second conduction (drain) terminal coupled to reference voltage level Vc. Transistor 125 is activated by control signal Pf being driven to a voltage level to turn on transistor 125. Once turned on, a conduction path exists between voltage level Vc and the write head terminal 42B, thereby serving to clamp write head terminal 42B to approximately reference voltage level Vc.

It is understood that clamp device 123 may be formed of other components to clamp write head terminal 42B to a desired voltage level.

Sub-circuit 103 further includes pull-up device 114 having p-channel transistor 115 connected between Vdd and write head terminal 42B. The gate terminal of transistor 115 is driven by a control signal PY and transistor 115 is sized so that pull-up device 114 serves as a switching transistor that provides current to write head 42. Pull-up device 114 is activated to source current to write head terminal 42B when current flow through write head 42 transitions in order to flow from write head terminal 42B to write head terminal 42A.

Sub-circuit 103 further includes a first current sink circuit 116 having a first current mirror circuit defined by transistors 106A and 116B, a second current mirror circuit defined by transistors 116C and 116D, and control transistor 116E having its gate terminal driven by a control signal NY1 so as to control the current flowing between the two current mirror circuits. First current sink circuit 116 is activated during the time current flow transitions in order to flow through write head 42 from write head terminal 42A to write head terminal 42B, and thereafter, as discussed below.

It is understood that, like first current sink circuit 106, first current sink circuit 116 may be implemented in a variety of different ways to produce a current that is controlled by a control signal (NY1, in this case).

Moreover, sub-circuit 103 includes second current sink circuit 117 having n-channel transistor 118 tied between write head terminal 42B and ground. The gate terminal of transistor 118 of second current sink circuit 117 is driven by a control signal NY. Transistor 118 is sized to provide a relatively low on resistance between the drain and source thereof. In this way, transistor 118 acts as a switching transistor in sinking a relatively large amount of current when activated. Second current sink circuit 117 is activated when current flow through write head 42 transitions in order to flow from write head terminal 42A to write head terminal 42B.

FIG. 3 shows sub-circuits 102 and 103 implemented with both n-channel and p-channel MOS transistors. It is understood that the sub-circuits 102 and 103, and particularly first current sink circuits 106 and 116 and second current sink circuits 107 and 117, may be implemented with p-channel MOS transistors, n-channel MOS transistors and/or other types of transistors.

Because existing driver circuits are typically powered by relatively higher power supplies, such as 8v, 10v and 12v power supplies, transistors in existing driver circuits have been implemented as high voltage MOS transistors having relatively high breakdown voltages. High voltage MOS transistors are, among other things, more expensive to fabricate and integrate with low voltage MOS transistors having lower breakdown voltages, and are slower in operation due to the relative size of the parasitic components associated with high voltage MOS transistors. To improve the performance and lower the cost associated with controlling write head 42, driver circuit 100 of a preferred embodiment of the present invention includes components which eliminate the need for using high voltage transistors, by protecting the maximum voltage swings or voltage differentials appearing across each transistor.

Specifically, driver sub-circuit 102 includes a p-channel "protection" transistor 128 which is connected in series between write head terminal 42A and pull-up device 104, and an n-channel "protection" transistor 129 which is connected in series between write head terminal 42A and first and second current sink circuits 106 and 107. The gate terminal of each of protection transistors 128 and 129 is biased at intermediate voltages Vref1 and Vref2, respectively, so that a finite on resistance exists between the drain and source terminals thereof. In this way, when pull-up device 104 is activated to provide a current to write head 42 through write head terminal 42A, a non-zero voltage drop appears across protection transistor 128 so that the voltage differentials appearing across the terminals of transistor 105 of pull-up device 104, such as the gate-drain voltage differential of transistor 105, is reduced. Similarly, when first current sink circuit 106 (and/or second current sink circuit 107) is activated to sink a current from write head 42 through write head terminal 42A, a non-zero voltage drop appears across protection transistor 129 so that the voltage differentials appearing across the terminals of transistor 106D (and/or transistor 108) of first current sink circuit 106 (second current sink circuit 107), such as the gate-drain voltage differential of transistor 106D (transistor 108), is reduced. The reduction in the voltage differentials across the terminals of transistor 105 of pull-up device 104, transistor 106D of first current sink circuit 106, and transistor 108 of second current sink circuit 107 allow for transistors 105, 106D and 108 to have a thinner gate oxide and thereby possess improved operating characteristics without experiencing a breakdown condition.

Because sub-circuit 103 is identical to sub-circuit 102, sub-circuit 103 includes p-channel protection transistor 130 connected in series between pull-up device 114 and write head terminal 42B, and n-channel protection transistor 131 connected in series between write head terminal 42B and first and second current sink circuits 116 and 117. As explained above with respect to protection transistors 128 and 121, protection transistor 130 reduces the voltage differentials appearing across the terminals of transistor 115 of pull-up device 114, and protection transistor 131 reduces the voltage differentials appearing across the terminals of transistor 116D of first current sink circuit 116 and transistor 118 of second current sink circuit 117. Consequently, transistors 115, 116D and 118 may each possess a thinner gate oxide thickness and thereby achieve enhanced operating characteristics without experiencing breakdown conditions.

It is understood that the specified bias applied to the gate terminal of and the size of each protection transistor 128–131 depend upon the desired operating characteristics of driver circuit 100, such as the power supply voltage Vdd, the desired gate oxide thicknesses for transistors 105, 106D, 108, 115, 116D and 118, the desired data rate, and the desired power dissipation. One preferred embodiment of the present invention may determine the gate terminal bias and the size for protection transistors 128–131 based upon a predetermined supply voltage Vdd and upon each transistor in driver circuit 100 having the same gate oxide thickness.

According to a preferred embodiment of the present invention, driver circuit 100 further includes a control circuit 130 for generating signals that control the activation of clamp devices 120 and 123, pull-up devices 104 and 114, first current sink circuits 106 and 116 and second current sink circuits 107 and 117. Control circuit 130 may form a portion of the circuitry located in controller 51 for disk storage device 1 in which driver circuit 100 may be disposed. Alternatively, control circuit 130 is instead separate from the controller 51 and receives as its input signals generated thereby.

Control circuit 130 generates control signal PX which drives the gate terminal of transistor 105 of pull-up device 104 through buffer 140; control signal PY which drives the gate terminal of transistor 115 of pull-up device 114 through buffer 141; control signal NX1 which drives the gate terminal of transistor 106E of first current sink circuit 106 and the anode of diode 124 (FIG. 3); control signal NY1 which drives the gate terminal of transistor 116E of first current sink circuit 116 and the anode of diode 121 (FIG. 3); and control signals Pe and Pf which drive the gate terminal of transistors 122 and 125, respectively (FIG. 4). In addition, control circuit 130 generates control signal NX which drives the gate terminal of transistor 108 of second current sink 107 through buffer 142, and control signal NY which drives the gate terminal of transistor 118 of second current sink circuit 117 through buffer 143.

In general terms, control circuit 130 activates clamp device 120 of driver sub-circuit 102 and first current sink circuit 116 of driver sub-circuit 103 during a first steady state condition wherein a predetermined steady state current level flows through write head 42 in a first direction (from write head terminal 42A to write head terminal 42B as shown in FIG. 3). Likewise, control circuit 130 activates clamp device 123 of driver sub-circuit 103 and first current sink circuit 106 of driver sub-circuit 102 during a second steady state condition wherein a predetermined steady state current level flows through write head 42 in a second direction (from write head terminal 42B to write head terminal 42A as shown in FIG. 3). In writing data onto a magnetic storage disk, control circuit 130 switches between activating pull-up device 104, clamp device 120 and first current sink circuit 116 and activating pull-up device 114, clamp device 123 and first current sink circuit 106.

As stated above, it is desirous to be able to quickly reverse the direction of current flowing through write head 42 in order to reduce the rate at which data can be written onto a magnetic storage disk 41. During the time the current flowing through write head 42 transitions between two directions, control circuit 130 deactivates clamp devices 120 and 123 and activates one of second current sink circuits 107 and 117 and one of pull-up devices 104 and 114. In particular, when control circuit 130 temporarily activates a first current sink circuit so as to sink current from write head 42, control circuit 130 activates the second current sink circuit associated therewith and the pull-up device associated with the other write head terminal. Activation of a first current sink circuit and the second current sink circuit associated therewith increases the amount of current drawn from write head 42 through the corresponding write head terminal. As a result of a first current sink circuit and corresponding second current sink circuit being simultaneously activated, the corresponding write head terminal is relatively quickly pulled towards ground, causing a relatively large voltage across write head 42. Consequently, the rise and fall times of the current signal passing through write head 42 are substantially reduced.

Due to the increase in current being drawn from write head 42 through the parallel combination of the first and second current sink circuits, the current passing through write head 42 will have a greater tendency to overshoot the destination or final steady state current level (i.e., the steady state current level in write head 42 following the reversal of current direction). In order to reduce the overshoot of the current signal passing through write head 42, control circuit 130 deactivates the previously-activated second current sink circuit when the current passing through write head 42 relatively slightly surpasses the destination steady state current level. In this way, the overshoot of current passing through write head 42 is reduced.

As stated above, control circuit 130 activates second current sink circuits 107 and 117 for the time period during which the current level flowing through write head 42 transitions between two steady state current levels. Because the operating characteristics of write head 42 may vary considerably, the activation time for second current sink circuits 107 and 117 is preferably programmable. In the same way, the time period of temporary activation of pull-up devices 104 and 114 is programmable.

Figure 5:
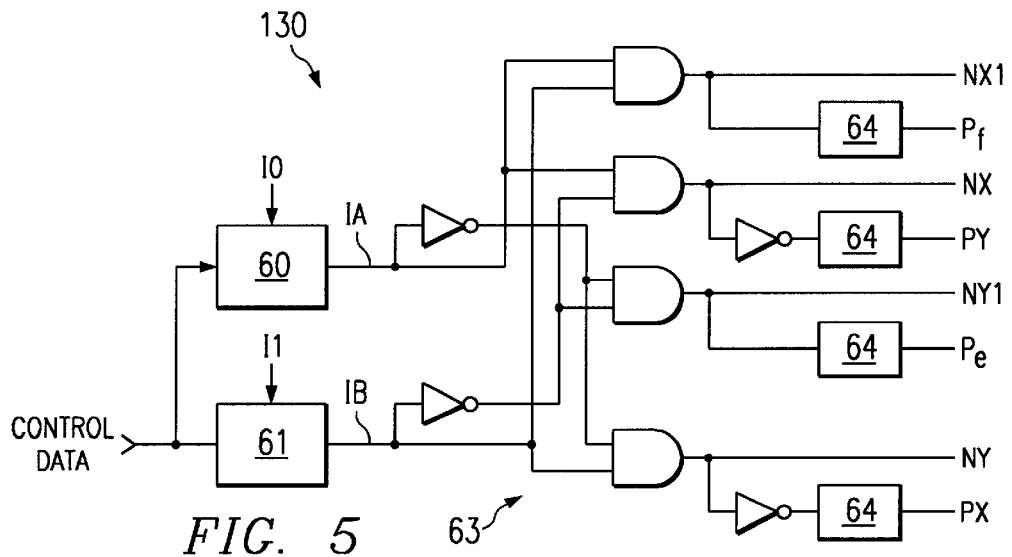
FIG. 5 is a schematic diagram of a timing control circuit according to the embodiments of the present invention.

FIG. 5 illustrates a schematic of a portion of control circuit 130 according to a preferred embodiment of the present invention. Control circuit 130 includes two delay elements 60 and 61 which respectively generate intermediate signals IA and IB. Each delay element 60 and 61 has an first input whose logical value is provided at the delay element output a period of time later based upon the amount of current provided at the second input of the delay element. In this case, the first inputs of delay element 60 and 61 are tied to a single control signal. Assuming comparable delays through the logic paths, the difference in the amount of current provided to delay elements 60 and 61 determines the amount of time second current sink circuits 107 and 117 are activated.

Control circuit 130 further includes combinational logic 63 which receives intermediate signals IA and IB and generates the control signals PX, PY, NX, NY, NX1, NY1, Pf and Pe based thereupon. Further, control circuit 130 includes level shifter circuits 64 that shift the voltage levels of control signals NX1, NY1 and the logical inversion of control signals NX and NY, for generating control signals Pf, Pe, PY and PX, respectively. Level shifter circuits 64 may, for example, shift the voltage levels of the signals appearing at the inputs thereof by approximately three volts (from an 0v–5v signal to a 3v–8v signal).

Figure 6:
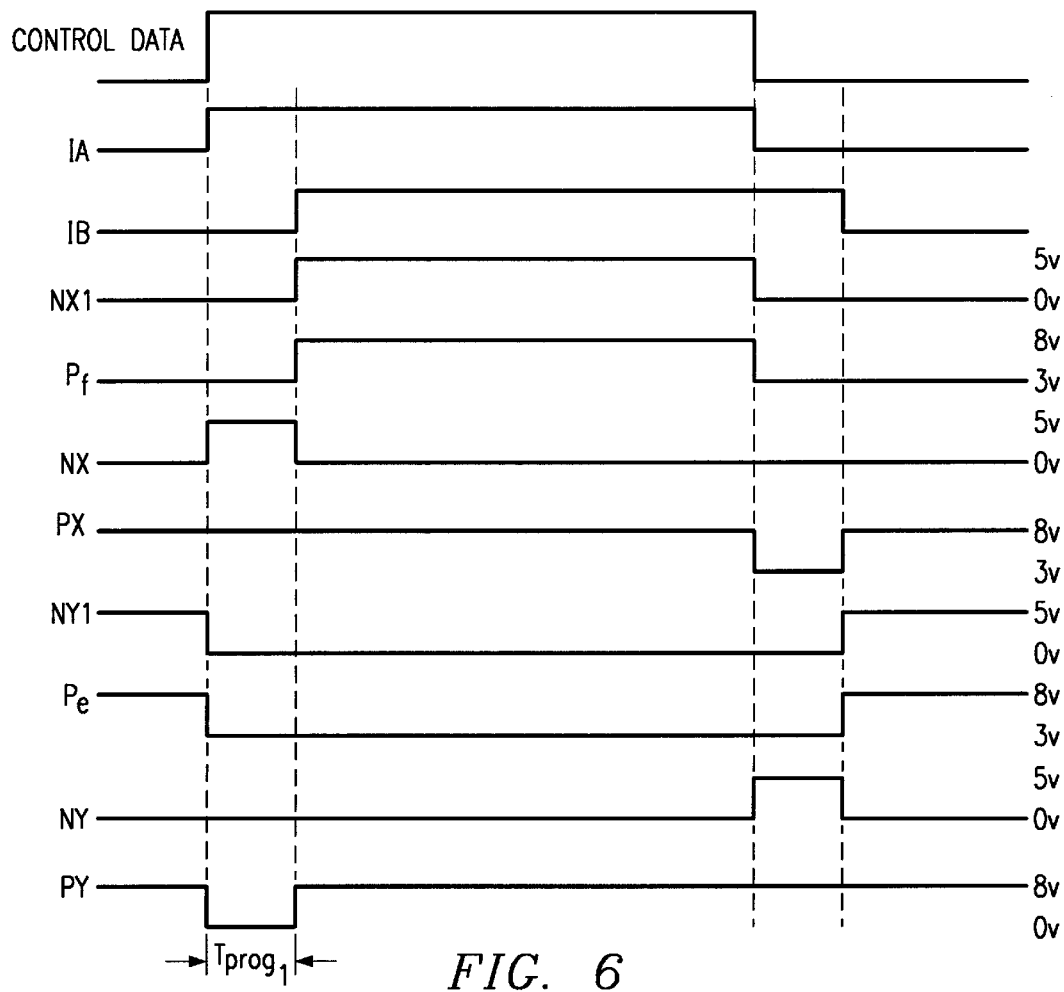
FIG. 6 illustrates the timing relationship for the signals generated by the control circuit shown in FIG. 5.

FIG. 6 illustrates the timing relationship between the control signal provided to delay elements 60 and 61 and control signals PX, PY, NX, NY, NX1, NY1, Pf and Pe.

Figure 7:
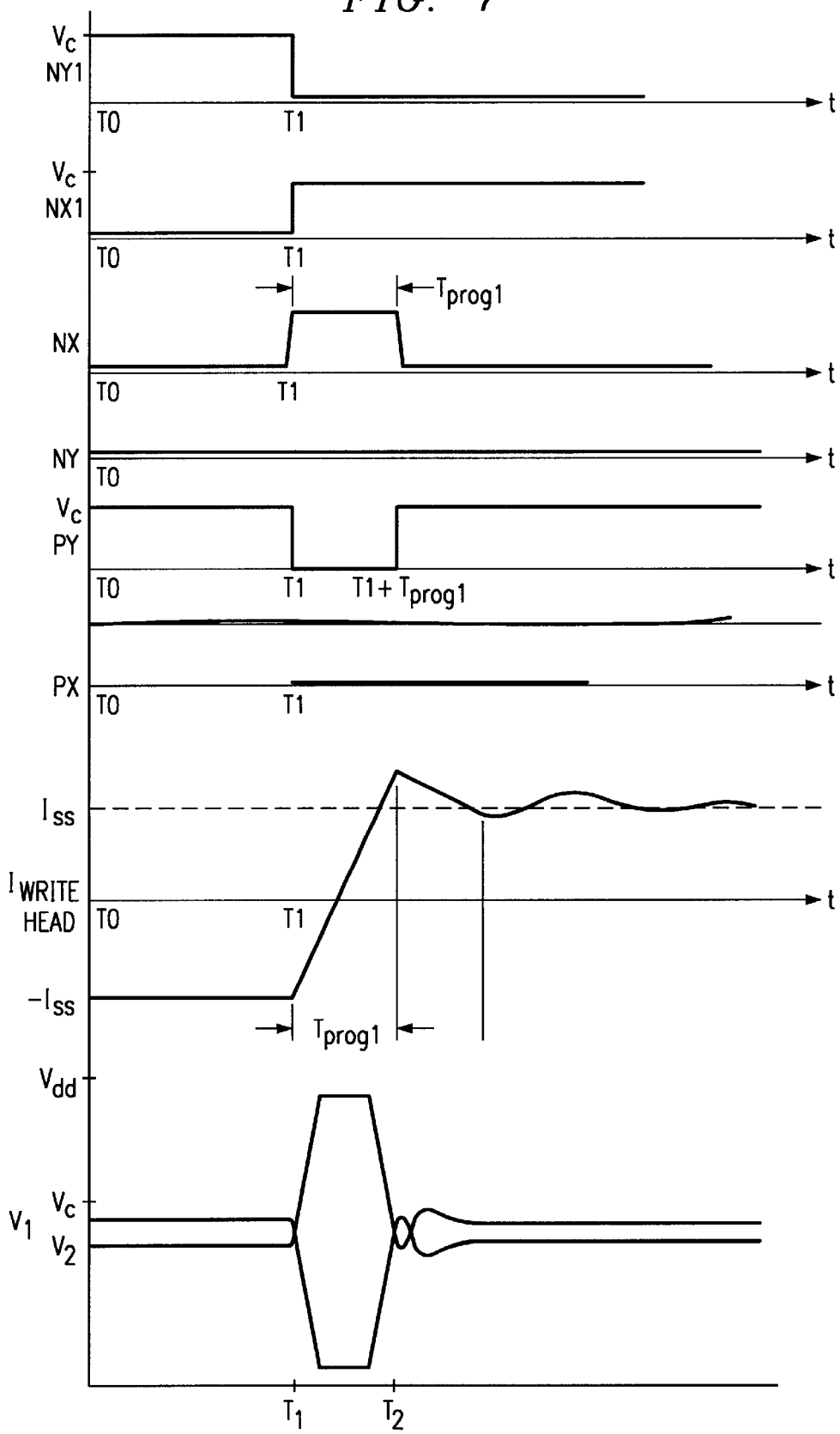
FIG. 7 illustrates a timing diagram corresponding to the operation of the driver circuit shown in FIG. 3.

The operation of driver circuit 100 of FIG. 3 will be described with reference to FIG. 7. In this example, current flowing through write head 42 from write head terminal 42B to write head terminal 42A is considered a positive current direction, and current flowing in the opposite direction. is considered a negative current direction. It is assumed that control circuit 130 has been programmed to activate pull-up devices 104 and 114 as well as second current sink circuits 107 and 117 for a predetermined period of time, Tprog1, so that such circuits are deactivated prior to the current in write head. 42 overshooting the destination steady state current level.

At time T0, driver circuit 100 is in a first steady state condition. Control circuit 130 applies a current source to the drain of transistor 106A to enable the current mirrors formed by transistors 106A and 106B and by 106A and 116B. Write head 42 is driven by driver circuit 100 to pass a negative steady state current level therethrough. In particular, control circuit. 130 drives control signal NY1 to reference voltage VC which activates clamp device 120 to source current to write head 42 through write head terminal 42A. Clamp device 120 clamps write head terminal 42A to a steady state voltage level V1 and write head terminal 42B to steady state voltage level V2. In particular, diode 121 is forward biased, having its anode tied to reference voltage Vc. With control signal NY1 at reference voltage Vc, transistor 116E is turned on and first current sink circuit 116 is enabled to draw current from write head 42 through write head terminal 42B. Conversely, control circuit 130 drives control signals PX and PY to the high reference voltage at time T0, and NX1 to the low reference voltage so that pull-up devices 104 and 114, first current sink circuit 106 and clamp device 123 are disabled. Second current sink circuits 107 and 117 are disabled at time T0 by control circuit 130 driving control signals NX and NY to a low logic level, respectively. Consequently, a steady state negative current level, -Iss, flows through write head 42 at time T0.

At time T1, driver circuit 100 initiates the reversal of current flow through write head 42. Control signal NY1 is driven to a low logic level by control circuit 130 to deactivate clamp device 120 (reverse bias diode 121) and first current sink circuit 116. Control circuit 130 also drives control signal PY to a low logic level at time T1 so that pull-up device 114 is activated. Control signal NX1 may be driven to reference voltage Vc at this time, which activates first current sink circuit 106. Consequently, the path of current flow changes at time Ti from an initial path including clamp device 120 and first current sink circuit 116 to a path including pull-up device 114 and first current sink circuit 106.

Although control signal NX1 is driven to a reference voltage Vc, diode 124 remains reversed biased due to the cathode of diode 124 having a greater voltage (Vdd) than the anode thereof (Vc).

Further, control circuit 130 drives control signal NX to a high logic level at time T1 which enables second current sink circuit 107 to sink current from write head 42 in parallel with first current sink circuit 106. As discussed above, with both first current sink circuit 106 and second current sink circuit 107 being activated, write head terminal 42A is quickly pulled towards the ground potential and a relatively sizeable amount of current is drawn from write head 42 through write head terminal 42A. The voltage differential across write head 42 is relatively large shortly after time T1. In particular, relatively large voltage spikes appear on write head terminals 42A and 42B. The voltage spikes have opposite polarity and substantially equal amplitudes and occur at substantially the same time. As a result, the capacitive coupling effect due to the voltage spike on one write head terminal substantially offsets the capacitive coupling effect of the voltage spike on the other write head terminal.

At time T1+Tprog1, a programmable period of time Tprog1 following time T1 and around the time the current level through write head 42 relatively slightly surpasses the destination steady state current level, Iss, control circuit 103 deactivates second current sink circuit 107 by control signal NX transitioning to a low logic level, which prevents second current sink circuit 107 from further drawing current from write head 42. Programmable period of time Tprog1 is generated based upon the input signals applied to control circuit 130. At the same time T1+Tprog1, control circuit 130 drives control signal PY to a high logic level to deactivate pull-up device 114. With the cathode of diode 124 now no longer tied to high reference voltage level Vdd, diode 124 becomes forward biased and clamps write head terminal 42B to slightly below reference voltage Vc. Write head 42 thereafter approaches a second steady state operating condition, with the steady state voltage of write head terminals being slightly below reference voltage Vc.

As the voltage across write head 42 approaches zero, the current through write head 42 approaches a substantially constant current at the destination steady state current level Iss.

It is understood that although control signal NX1 is shown as having been asserted at time T1, control signal NX1 may be asserted at any time between time T1 and time Tprog1. This is in part due to second current sink circuit 107 being capable of sinking substantially more current than first current sink circuit 106. Consequently, the exact time of activation of first current sink circuit 106 (assertion of control signal NX1) between time T1 and time Tprog1 is not critical.

It can be seen that if reference voltage Vc is selected. at approximately the midpoint between high reference voltage Vdd and low reference voltage Vss, the voltage spikes appearing on write head terminals 42A and 42B will have substantially the same amplitudes.

It is understood that driver circuit 100 and write head 42 operate in a symmetrical manner to the above-described operation when driver circuit 100 causes the current flowing through write head 42 to reverse direction from the steady state current level Iss to the steady state current level -Iss. Accordingly, such current direction reversal will not be described.

Figure 8:
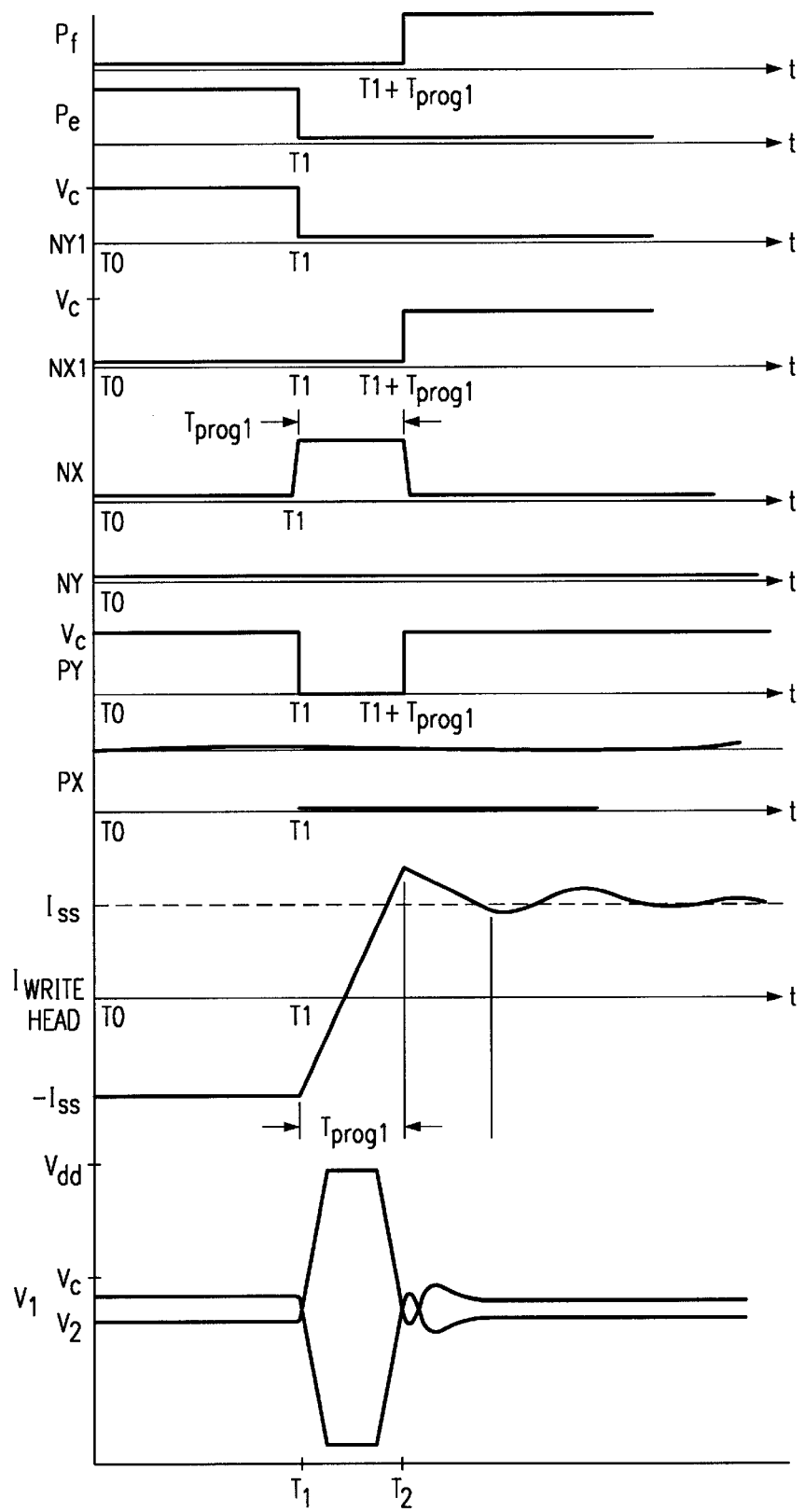
FIG. 8 is a timing diagram of an operation of the driver circuit shown in FIG. 4.

The operation of driver circuit 100 shown in FIG. 4 is similar to the operation described above with respect to FIG. 3. The timing of control signals NX, NY, NY1, PX and PY remains the same. Referring to FIG. 8, however, control signal Pe is at a high logic level at time T0, which activates transistor 122 and thus connects write head terminal 42A to approximately reference voltage Vc. This connection clamps write head terminals 42A and 42B to steady state voltage levels approximately at reference voltage Vc (with the steady state voltage level of write head terminal 42A being slightly larger than the steady state voltage level of write head 42B). At this time, control signal Pf is at a low logic level so as to turn off transistor 125.

At time T1, control signal Pe is set to a low logic level. This turns off transistor 122. Transistor 125 remains in a turned off state at this time. As a result, between time T1. and T1+Tprog1, write head terminal 42A is pulled towards low reference voltage Vss (first current sink circuit 106 and second current sink circuit 107 being activated) and write head terminal 42B is pulled towards high reference voltage Vdd (pull-up device 114 being activated).

Next, at time T1+Tprog1, control signal NX is driven to a low logic level which turns off second current sink circuit 107. In addition, control signal PY is driven to a high logic level to turn off pull-up device 114. Control signal Pf is driven to a high logic level, which turns on transistor 125 and thus clamps write head terminal 42B to reference voltage Vc. Control signal NX1 (being the logical inverse of control signal Pe) is driven to a high logic level which turns on first current sink circuit 106. Shortly after time T1+Tprog1, write head terminal 42 settles into a second steady state condition, with write head terminal 42B at reference voltage Vc and write head terminal 42A at a voltage that is slightly below reference voltage Vc. Clamping write head terminal 42B at time T1+Tprog1 to reference voltage Vc (approximately at a midpoint between high and low reference voltages Vdd and Vss, respectively) results in a pair of voltage spikes appearing on write head terminals 42A and 42B. The voltage spikes have substantially equal amplitude and opposite polarity relative to each other.

It is understood that because write head driver circuits may utilize relatively higher voltage power supplies, such as 10v and 12v power supplies, portions of driver circuit 100 may be connected to different reference voltage levels. For instance, in the event driver circuit 100 utilizes an 8v--12v power supply, first current sink circuits 106 and 116 and second current sink circuits 107 and 117 may be connected between a first intermediate reference voltage, such as 5v, and ground. In this case, pull-up devices 104 and 114 may be connected between the 8v–12v supply voltage and a second intermediate reference voltage, such as 3v.

As described above, control circuit 130 activates pull-up devices 104 and 114 to primarily control the sourcing of current to write head 42 during the time the current write through head 42 changes direction. It is understood that control circuit 130 may activate other pull-up devices during the temporary, predetermined time period instead of activating pull-up devices 104 and 114.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller for a write head of a disk drive, comprising:
    a first pull-up device coupled between a first terminal of the write head and a high reference voltage level;
    a second pull-up device coupled between a second terminal of the write head and the high reference voltage level; a first current sink circuit coupled between the first terminal of the write head and a low reference voltage level;
    a second current sink circuit coupled between the second terminal of the write head and the low reference voltage level;
    a first clamp device coupled to the first terminal of the write head;
    a second clamp device coupled to the second terminal of the write head; and
    a control circuit, having output terminals connected to the first and second pull-up devices, the first and second current sink circuits and the first and second clamp devices, for selectively activating the first and second pull-up devices and the first and second current sink circuits so as to pass current through the write head in a first direction and a second direction, the control circuit selectively activates at least one of the first and second clamp devices at a time when the write head is in a steady state operating condition so as to clamp the first and second terminals of the write head to predetermined steady state voltage levels.

2. The controller of claim 1, wherein:
the control circuit activates the at least one of the first and second clamp devices associated with the terminal of the write head having the greater voltage level.

3. The controller of claim 1, wherein:
the first and second clamp devices clamp the first and second terminals of the write head to predetermined steady state voltage levels that are approximately at a midpoint between the high and low reference voltage levels.

4. The controller of claim 1, wherein:
the control circuit activates the at least one of the first and second clamp devices following activation of one of the first and second pull-up devices coupled thereto.

5. The controller of claim 1, wherein:
the first clamp device comprises a first diode having a cathode couple d to the first terminal of the write head; and
the second clamp device comprises a second diode having a cathode coupled to the second terminal of the write head.

6. The controller of claim 5, wherein:
a first output of the control circuit is connected to the anode of the first diode; and
a second output of the control circuit is connected to the anode of the second diode.

7. The controller of claim 6, wherein:
the control circuit substantially simultaneously drives the anode of a first one of the first and second diodes to a first voltage level at approximately a midpoint between the high and low reference voltage levels so as to activate the first one of the first and second diodes, and the anode of a second one of the first and second diodes to the low reference voltage level to deactivate the second one of the first and second diodes.

8. The controller of claim 7, wherein:
the control circuit activates one of the first and second pull-up devices for a predetermined period of time to initiate a reversal of current through the write head, and activates the first one of the first and second diodes following the activation of the one of the first and second pull-up devices.

9. The controller of claim 1, wherein:
the first clamp device comprises a first transistor having a first conduction terminal coupled to the first terminal of the write head, and a control terminal;

the second clamp device comprises a second transistor having a first conduction terminal coupled to the second terminal of the write head, and a control terminal; and the control circuit includes a first output connected to the control terminal of the first transistor and a second output connected to the control terminal of the second transistor.

10. The controller of claim 9, wherein:

each of the first and second transistors includes a second conduction terminal coupled to a reference voltage level.

11. The controller of claim 10, wherein:

the reference voltage level is approximately at a midpoint between the high and low reference voltage levels.

12. The controller of claim 10, wherein:

the control circuit activates one of the first and second pull-up devices for a predetermined period of time to initiate a reversal of current through the write head, and activates a first one of the first and second transistors following the activation of the one of the first and second pull-up devices.

13. A disk drive, comprising:

at least one disk on which data is stored;

a spindle motor and controller therefor, the spindle motor being operably connected to the at least one disk;

a read head positioned proximally to the at least one disk;

read channel circuitry, coupled to the read head, for converting signals received on the read head;

a write head positioned proximally to the at least one disk and including a first terminal and a second terminal; and write channel circuitry, coupled to the first and second terminals of the write head, for placing data on the write head during a write operation, the write channel circuitry clamps at least one of the first and second terminals of the write head to a predetermined voltage level during steady state operating conditions for the write head so that the first and second terminals of the write head have predetermined steady state voltage levels and that voltage spikes appearing on the first and second terminals of the write head during times between steady state conditions are of opposite polarity and substantially equal amplitudes.

14. The disk drive system of claim 13, wherein the write channel circuitry comprises:

a first clamp device coupled to the first terminal of the write head;

a second clamp device coupled to the first terminal of the write head; and a control circuit, having output terminals connected to the first and second clamp devices, for passing current through the write head in a first direction and a second direction, and selectively activating at least one of the first and second clamp devices at a time so as to clamp the first and second terminals of the write head to the predetermined steady state voltage levels.

15. The disk drive system of claim 14, wherein:

the write channel circuitry further comprises:

a first pull-up device coupled to the first terminal of the write head and a high reference voltage level;

a second pull-up device coupled to the second terminal of the write head and the high reference voltage level; and first and second current sink devices connected to the first and second terminals of the write head, respectively, and to a low reference voltage level; and the first and second clamp devices clamp the first and second terminals of the write head to predetermined steady state voltage levels that are approximately at a midpoint between the high and low reference voltage levels.

16. The disk drive system of claim 14, wherein:

the write channel circuitry further comprises:

a first pull-up device coupled to the first terminal of the write head and a high reference voltage level;

a second pull-up device coupled to the second terminal of the write head and the high reference voltage level; and first and second current sink devices connected to the first and second terminals of the write head, respectively, and to a low reference voltage level; and the control circuit activates one of the first and second pull-up devices for a predetermined period of time to initiate a reversal of current through the write head, and activates a first one of the first and second clamp devices following the activation of the one of the first and second pull-up devices.

17. The disk drive system of claim 16, wherein:

the first one of the first and second clamp devices is coupled to the one of the first and second pull-up devices activated for the predetermined period of time.

18. The disk drive system of claim 14, wherein:

the first and second clamp devices comprise first and second diodes, respectively, each of the first and second diodes including a cathode coupled to a one of the first and second terminals of the write head and an anode connected to an output of the control circuit.

19. The disk drive system of claim 14, wherein:

the first and second clamp devices comprise first and second transistors, respectively, each of the first and second transistors including a first conduction terminal coupled to a one of the first and second terminals of the write head, a second conduction terminal connected to a reference voltage, and a control terminal connected to an output of the control circuit.

20. A system for processing information, comprising:

a processing element;

a memory element coupled to the processing element;

a nonvolatile memory element, comprising:

a disk on which information may be stored;

a read head for reading information stored on the disk;

read channel circuitry, coupled to the read head, for converting signals received on the read head;

a write head positioned proximally to the at least one disk and including a first terminal and a second terminal; and write channel circuitry, coupled to the first and second terminals of the write head, for placing data on the write head during a write operation, the write channel circuitry clamps at least one of the first and second terminals of the write head to a predetermined voltage level when the write head is in a steady state condition so that the first and second terminals of the write head have predetermined steady state voltage levels and that voltage spikes appearing on the first and second terminals of the write head during times between steady state conditions are of opposite polarity and substantially equal amplitudes.

21. The system of claim 20, wherein the write channel circuitry comprises:

a first clamp device coupled to the first terminal of the write head;

a second clamp device coupled to the first terminal of the write head; and a control circuit, having output terminals connected to the first and second clamp devices, for passing current through the write head in a first direction and a second direction, and selectively activating at least one of the first and second clamp devices at a time so as to clamp the first and second terminals of the write head to the predetermined steady state voltage levels.

22. The system of claim 21, wherein:

the write channel circuitry further comprises:

a first pull-up device coupled to the first terminal of the write head and a high reference voltage level;

a second pull-up device coupled to the second terminal of the write head and the high reference voltage level; and first and second current sink devices connected to the first and second terminals of the write head, respectively, and to a low reference voltage level; and the first and second clamp devices clamp the first and second terminals of the write head to predetermined steady state voltage levels that are approximately at a midpoint between the high and low reference voltage levels.

23. The system of claim 21, wherein:

the control circuit includes a first output and a second output;

the first clamp device and the second clamp device each comprise a diode having a cathode connected to one of the first and second terminals of the write head and an anode connected to one of the first and second outputs of the control circuit.

24. The system of claim 21, wherein:

the first and second clamp devices comprise first and second transistors, respectively, each of the first and second transistors including a first conduction terminal coupled to a one of the first and second terminals of the write head, a second conduction terminal connected to a reference voltage, and a control terminal connected to an output of the control circuit.

25. A method of controlling the write head of a disk drive, the write head including a first terminal and a second terminal, the method comprising the steps of:

sinking current from the first terminal to a low reference voltage source;

sourcing current to the second terminal from a reference voltage level substantially simultaneously with sinking current from the first terminal so that a first steady state current flows through the write head in a first direction;

sinking current from the second terminal to the low reference voltage source following the step of sinking current from the first terminal;

sourcing current to the first terminal from a high reference voltage source substantially simultaneously with the step of sinking current from the second terminal, so that current flow transitions from a first direction to a second direction; and clamping the first terminal to the reference voltage level following the step of sourcing current to the first terminal, so that a second steady state current flows through the write head in a second direction and the voltage levels appearing on the first and second terminals settle to predetermined steady state voltage levels and that voltage spikes appearing on the first and second terminals of the write head around the time current transitions from the first direction to the second direction are of opposite polarity and substantially equal amplitudes.

26. The method of claim 25, wherein:

the steps of sourcing current to the first terminal and sinking current from the second terminal occur for a predetermined period of time.

27. The method of claim 25, wherein:

the predetermined steady state voltage levels are approximately at a midpoint between the high and low reference voltage sources.

* * * * *

UNITED STATES PATENT AND TRADEMARK OFFICE
CERTIFICATE OF CORRECTION

PATENT NO. : 6,504,666 B1
DATED : January 7, 2003
INVENTOR(S) : Giuseppe Patti et al.

It is certified that error appears in the above-identified patent and that said Letters Patent is hereby corrected as shown below:

Column 2,
Line 35, replace "p One problem" with -- One problem -- (New Paragraph)

Column 7,
Line 10, replace "sink circuit: 107" with -- sink circuit 107 --

Column 11,
Line 16, replace "opposite direction. is" with -- opposite direction is --
Line 22, replace "head. 42" with -- head 42 --
Line 29, replace "circuit. 130" with -- circuit 130 --
Line 58, replace "time Ti from" with -- time T1 from --

Column 12,
Line 47, replace "selected. at" with -- selected at --

Column 14,
Line 37, replace "couple d" with -- coupled --

Signed and Sealed this

Fifth Day of August, 2003

JAMES E. ROGAN
*Director of the United States Patent and Trademark Office*